United States Patent [19]
Arendt et al.

[11] Patent Number: 5,259,657
[45] Date of Patent: Nov. 9, 1993

[54] VISOR EXTENDER

[76] Inventors: Edward F. Arendt, 122 Shirley Ridge Dr., St. Charles, Mo. 63304; Michael E. Arendt, 6827 Elderberry Dr., Newport Richey, Fla. 34653

[21] Appl. No.: 947,276

[22] Filed: Sep. 18, 1992

[51] Int. Cl.$^5$ .............................................. B60J 3/02
[52] U.S. Cl. ................................... 296/97.6; 296/97.8
[58] Field of Search ............................ 296/97.6, 97.8

[56] References Cited

U.S. PATENT DOCUMENTS

| | | | |
|---|---|---|---|
| 2,833,591 | 5/1958 | Kurtzke | 296/97.6 |
| 3,954,297 | 5/1976 | Linke | 296/97 |
| 4,023,855 | 5/1977 | Janata et al. | 296/97 C |
| 4,570,991 | 2/1986 | Lystad | 296/97 G |
| 4,582,356 | 4/1986 | Kaiser et al. | 296/97 K |
| 4,635,995 | 1/1987 | Mineck | 296/97.6 |
| 4,690,451 | 9/1987 | Killar | 296/97.6 |
| 4,736,979 | 4/1988 | Harvey | 296/97.6 |
| 4,792,176 | 12/1988 | Karford | 296/97.8 |
| 4,824,161 | 4/1989 | Lee | 296/97.8 |
| 4,902,063 | 2/1990 | Crink | 296/97.11 |
| 4,984,840 | 1/1991 | Lansing | 296/97.6 |
| 5,042,867 | 8/1991 | Crotty, III et al. | 296/97.8 |
| 5,044,685 | 9/1991 | Yang | 296/97.6 |
| 5,098,149 | 3/1992 | Lee | 296/97.8 |
| 5,165,748 | 11/1992 | O'Conner | 296/97.6 |

FOREIGN PATENT DOCUMENTS 2706517 8/1978 Fed. Rep. of Germany ..... 296/97.6

*Primary Examiner*—Robert R. Song
*Attorney, Agent, or Firm*—Senniger, Powers, Leavitt & Roedel

[57] ABSTRACT

A visor extender having a housing with opposite surfaces and a passageway defined therein. A shield moves within the passageway from a position in which the shield is concealed by the housing to a position in which the shield extends laterally from the housing. At least one strap attaches the housing to a visor. The strap may be wrapped around the visor to attach the housing thereto such that one surface of the housing is in face-to-face relation to the visor. The shield is further capable of extending laterally beyond the periphery of the visor. A clip may also be provided to attach the housing of the visor extender to the visor.

4 Claims, 3 Drawing Sheets

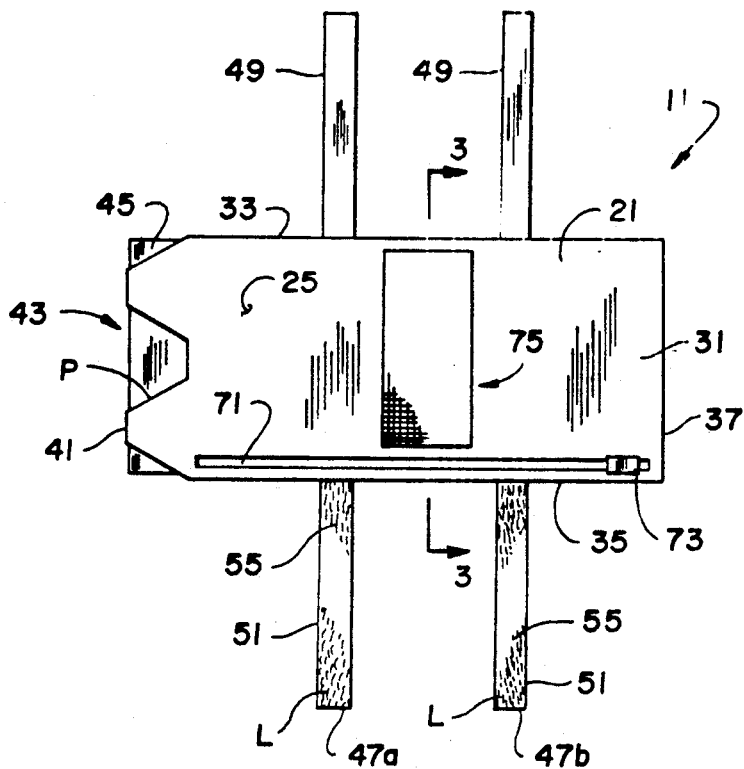
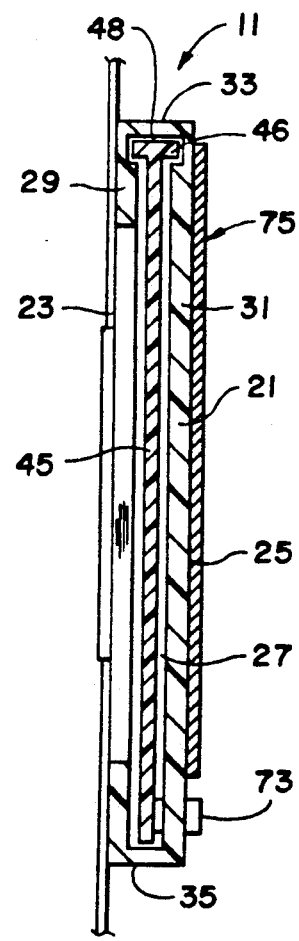
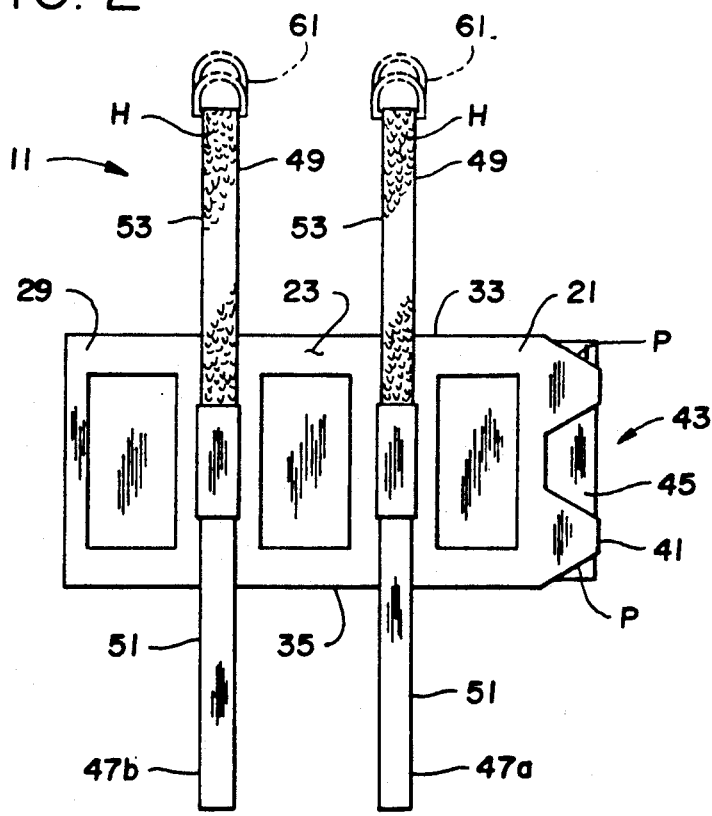

VISOR EXTENDER

SUMMARY OF THE INVENTION

This invention relates generally to visors and more particularly to an automobile visor extender which may be releasably attached to an existing automobile visor for increasing the overall size of the visor.

The invention involves improvements for facilitating the fastening and removal of a visor extender to an existing automobile visor. One such visor extender is shown in U.S. Pat. No. 4,792,176 which shows a visor extension unit attached to a conventional automobile visor by velcro fasteners permanently affixed to the visor matching complementary velcro fasteners permanently affixed to the visor extension unit. One way of attaching the fasteners to their respective surfaces disclosed in U.S. Pat. No. 4,792,176 is to use a pressure sensitive adhesive to permanently bond the fasteners to their respective surfaces. This arrangement, however, has the unsatisfactory result of requiring the visor extender or its mounting elements to be permanently mounted on the visor. Removal of the extender or mounting elements would permanently deface the visor.

Accordingly, among the several objects of the present invention may be noted the provision of a visor extender which may be non-destructively attached and removed from an automobile visor; the provision of such a visor extender which does not permanently deface the surface of the automobile visor; the provision of such a visor extender which may easily be moved between a retracted position and an extended position; the provision of such a visor extender which is capable of being attached to visors having different shapes and sizes; and the provision of such a visor extender which is simple in design, economical to manufacture, and easy to use.

Generally, a visor extender for use in association with a visor of a vehicle for covering portions of a windshield and side windows of the vehicle comprises a housing having opposite outer surfaces and a passageway defined therein. A shield is movable within the passageway from a retracted position in which the shield is generally disposed within the housing to a position in which the shield extends laterally from the housing. The shield is dimensioned such that it is of slightly lesser cross-sectional area than the cross-sectional area of the passageway. Means for attaching the housing to the visor comprises at least one strap mounted on one of the opposing outer surfaces of the housing. The strap is adapted to be wrapped around the visor to attach the housing thereto such that one of the outer opposing surfaces of the housing is in face-to-face relation to the visor. The shield is capable of extending laterally outwardly from the visor. Means for fastening the strap about the visor such that the housing and the strap encompass the visor is further provided.

Other objects and features will be in part apparent and in part pointed out hereinafter.

BRIEF DESCRIPTION OF THE DRAWINGS

FIG. 1 is a front elevation of a visor extender of the present invention;

FIG. 2 is a rear elevation of the visor extender;

FIG. 3 is an enlarged cross-section taken along line 3—3 in FIG. 1;

Corresponding parts are designated by corresponding reference numerals in the several views of the drawings.

DESCRIPTION OF THE PREFERRED EMBODIMENT

Figure 4:
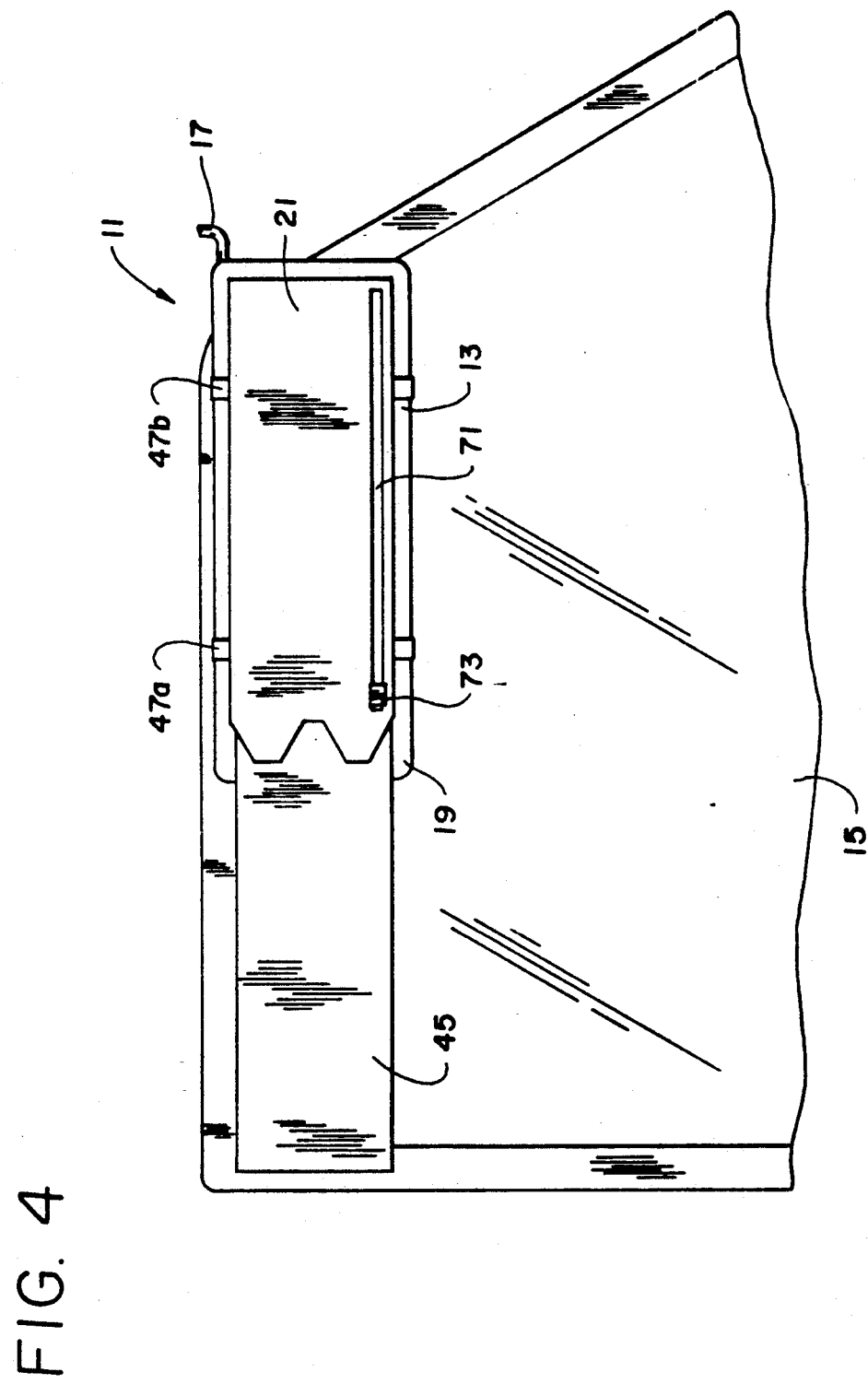
FIG. 4 is an elevation showing the visor extender attached to a visor of an automobile, a shield of the visor extender being in its extended position.

Referring now to the drawings, and particularly to FIG. 4, there is generally indicated at 11 a visor extender for use in association with a visor 13 of a vehicle for covering portions of a windshield (not shown) or a side window 15 of the vehicle. As is well known in the art, the visor 13 is generally movable between a stowed position generally against the vehicle roof and a use position extending down from the roof and partially covers the windshield or side window. The visor 13 is capable of pivoting on an arm 17 attached to the vehicle from a position in which it is able to partially cover a portion of the windshield of the vehicle to a position in which it is able to partially cover a portion of the side window 15 of the vehicle (as shown in FIG. 4). In an automobile visors are typically located on the driver's and front passenger's sides of the automobile to protect the driver and the passenger from excess glare from the sun or from on-coming traffic head lights. However, it is to be understood that the visor extender disclosed herein may be used in any instance where there is a visor and a person desires to extend the visor laterally.

The standard visor in an automobile is not able to cover enough of the windshield or side window to block the sun particularly during certain times of the day. For example, when the visor 13 is covering the side window 15, it does not extend laterally far enough to cover the entire top portion of the side window (e.g., beyond edge margin 19). Therefore, light from the sun can pass through the side windows, to the head of the driver or passenger. This is especially true for tall drivers or passengers.

Turning now to FIGS. 1-3, the visor extender 11 includes a housing 21 having opposite outer surfaces 23, 25 and a passageway 27 defined therein. The housing 21 is comprised of first and second spaced-apart generally rectangular walls 29, 31 in which the walls are attached along overlying lateral edge margins and at overlying end margins at one end of the walls. The lateral edge margins of the housing are indicated by reference numerals 33 and 35, and the closed end is indicated by reference numeral 37. As shown, surface 23 is to the outer surface of wall 29 and surface 25 is to the outer surface of wall 31. Portions of wall 29 are removed for decreasing the amount of material which is beneficial in manufacturing the visor extender. The housing is open at the other end 41 to define a mouth, indicated generally at 43, providing access to passageway 27.

A generally opaque shield 45, having a shape corresponding generally to the rectangular shape of the housing 21, is slidable within the passageway 27. The shield 45, along with the housing 21, may be of a suitable synthetic resin material (plastic), such as high-density polyethylene. The shield 45 is capable of being moved from a retracted position in which the shield is disposed within the passageway 27 and thereby substantially concealed by the housing (see FIGS. 1 or 2), to an extended position in which the shield extends laterally from the housing (see FIG. 4). The shield 45 is capable of extending laterally beyond the edge margin 19 of the visor 13. As shown in FIG. 3, the shield 45 is dimensioned such that it is of slightly lesser cross-sectional area than the cross-sectional area of the passageway 27, thereby allowing the shield to slide within the passageway. The upper edge margin of shield 45 has a T-shaped cross-section as indicated at 46 which is slidable within a correspondingly shaped recess 48 formed in the passageway 27. The T-shaped edge margin 46 is provided to guide the shield within passageway 27.

The housing 21 of the visor extender 11 is attached to the visor 13 by at least one strap (broadly "attaching means") mounted on one surface of the housing. In the illustrated embodiment, there are a pair of straps, designated 47a, 47b, attached to surface 23 of wall 29. The straps 47a, 47b are wrapped around the visor 13 to attach the housing 21 to the visor. Any number of straps could be provided for securing the visor extender 11 to the visor 13. Each strap (47a or 47b) is attached to the surface 23 by adhesive, such as glue, generally centrally along the length of the strap so that one portion 49 of the strap extends to the top edge margin 33 of the housing and the second portion 51 of the strap extends to the bottom edge margin 35 of the housing. When attached to the visor 13, the housing 21 is in a face-to-face relation to the visor in which surface 23 is positioned against the face of the visor. It does not necessarily matter which face of the visor the housing is attached to, however, as shown in FIG. 4, the housing may be attached to the face of the visor facing the driver when the visor is positioned to cover the side window 15. The straps 47a, 47b may be of any flexible material (e.g., cloth or nylon), or may be of elastic "material for tightly wrapping the straps around the visor 13 to attach the housing 21 to the visor.

Hook and loop fastener material (broadly "fastening means") may be provided for fastening the strap about the visor such that the housing 21 and the strap 47 encompass the visor 13. The hook and loop fastener material is commonly known by its trade name "Velcro". More particularly, for each strap (47a or 47b), hook material H is disposed on one surface 53 of the strap while loop material L is disposed on a second surface 55 of the strap. Referring to FIGS. 1 and 2, the top portion 49 of each strap has the surface 53 having the hook material H, while the bottom portion 51 of each strap has the surface 55 having the loop material L. Of course, the hook and loop material could be positioned in any configuration so long as the strap is capable of being securely held about the visor 13. The portions 49 and 51 are wrapped about the visor 13 and the hook H material and loop L material of each surface 53, 55 are releasably interengaged for securing the housing 21 to the visor. Another way of securing the visor extender 11 about the visor 13, shown in FIG. 2 is to attach a buckle 61 to an end of either portion 49 or 51, in place of the hook and loop material. In its shown configuration (see FIG. 2), the buckle 61 is attached to the top portion 49 and receives the bottom portion 51 to securely fasten the strap about the visor. However, it is to be understood that other buckles made from metal or plastic other than the ones shown in FIG. 2 (e.g., buckles having tongues engageable with openings, coupling type buckles or snap locking type buckles) may be provided and fall within the scope of the present invention.

Figure 5:
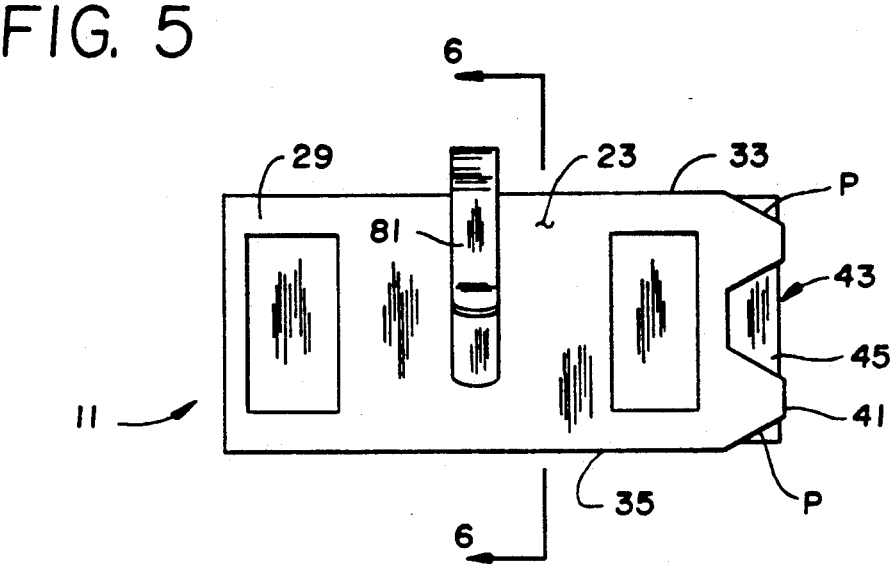
FIG. 5 is rear elevation of a visor extender having a clip for releasably attaching the visor extender to a visor.
Figure 6:
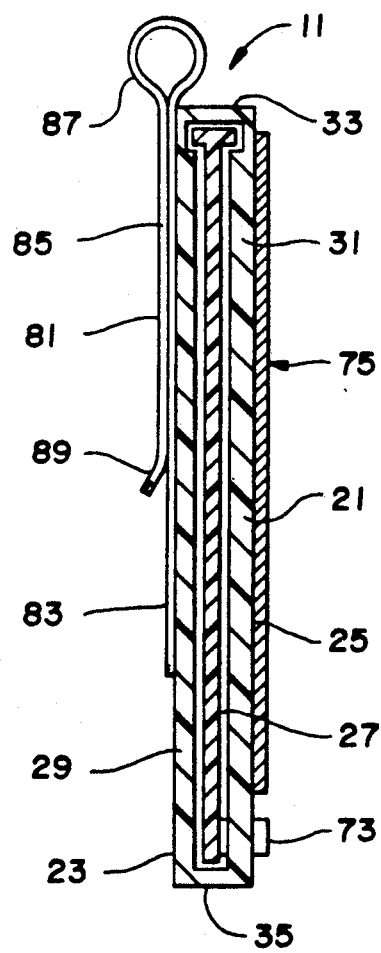
FIG. 6 is an enlarged cross-section taken along line 6—6 in FIG. 5.

Referring now to FIGS. 5 and 6, a clip 81 is mounted on the housing 21 of the visor extender 11 for releasably attaching the visor extender on a visor 13. Clip 81 is made from resilient material, such as spring steel, and comprises a first leg 83 mounted on surface 23 of the housing 21 and a second leg 85 integrally connected to the first leg 81 by a spring portion 87 such that the second leg 85 resiliently engages the first leg. The second leg 85 includes a foot 89 at its free end opposite the end where the second leg meets the spring portion for facilitating the movement of the second leg over an edge of a visor (e.g., visor 13) when releasably attaching the visor extender to a visor.

Provided in wall 31 (opposite the wall 29 where straps 47 are fastened to) is a slot 71 formed near edge a margin 35 of the housing 21 which extends substantially along the length of the wall. The shield 45 has a moving member 73 mounted on the shield and extending perpendicularly from the shield in registry with the slot. The moving member 73 extends through the slot 71 for moving the shield between its retracted and extended positions. The moving member 73 may be grasped by a person between the thumb and forefinger for moving the member and shield 45. The moving member 73 is engageable with the housing 21 at the end of the slot 71 to prevent the shield 45 from being removed completely from the housing 21.

The shield 45 may also be moved relative the housing 21 by grasping the shield where portions P of the housing are removed. As shown in FIG. 1, a portion P of the housing 21 (walls 29, 31) is removed near end 41 so that the shield 45 may conveniently be moved to its extended position.

Further provided is an elastic strap, indicated generally at 75, which is attached at its opposite ends to side 25 of housing 21. The elastic strap 75 is capable of receiving and retaining articles placed between the strap and the housing, such as identification cards or the like.

In use, a visor extender 11 may be releasably attached to an automobile visor 13 by velcro straps 47a, 47b (or buckles 61) such that the housing 21 of the visor extender is in a face-to-face relation to the visor. The visor extender may also be releasably attached to visor 13 by clip 81. The shield 45 may be moved in passageway 27 Provided within the housing 21 from its retracted position to its extended position in which it extends laterally from end 41 of the housing 21 (and end 19 of the visor 13). The shield 45 may be moved by the moving member 73 which extends from the shield through the slot 71 provided in the housing 21. The shield 45 may also be moved by grasping the shield where portions P of the housing are removed. After using the visor extender 11, the shield 45 may be moved back to its retracted position in which it is substantially disposed within the passageway 27. The straps 47a, 47b may then be removed from the visor 13 without defacing the visor 13.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A visor extender for use in association with a visor of a vehicle for covering portions of a windshield or side windows of the vehicle, the visor being movable between a stowed position and a use position, the visor being further adapted to pivot from a position in which it partially covers a portion of the windshield of the vehicle to a position in which it partially covers a portion of the side window of the vehicle, said visor extender comprising:

a housing having opposite outer surfaces and a passageway defined therein, the housing further having first and second generally rectangular walls, the first wall being attached on three sides thereof to the second wall and open on one side theeof to define a mouth;

a shield movable within the passageway from a retracted position in which the shield is generally disposed within said housing to a position in which the shield extends laterally from the housing through the mouth, said shield being dimensioned such that it is of slightly lesser cross-sectional are than the cross-sectional area of the passageway;

means for attaching the housing to the visor, said attaching means comprising at least one flexible, non-elastic strap mounted on one of said opposing surfaces of the housing, the strap being adapted to be wrapped around the visor to attach the housing thereto such that one of said outer opposing surfaces of the housing is in face-to-face relation to the visor, the shield being capable of extending laterally outwardly from the visor; and means for fastening the strap about the visor such that the housing and the strap encompass the visor, the strap being generally centrally mounted along the length of the strap on the housing such that the strap extends transversely of the housing, and wherein said fastening means comprises a buckle attached to an end of one portion of the strap, said buckle being adapted to receive the other portion of the strap for fastening the strap to the visor, said portions of the strap being of sufficient lengths for attaching and fastening said visor extender about visors having various widths, wherein one of said walls has a slot formed therein extending substantially the length of the wall, said shield comprising a moving member extending from the shield in registry with the slot such that the moving member extends through the slot for moving the shield between its retracted and extended positions, said moving member being located on the right-hand end of the shield when the shield is i its retracted position, and upon moving the shield to the left to its extended position, said moving member being generally adjacent the mouth of the housing thereby providing substantially full extension of the shield relative to the housing.

2. A visor extender for use in association with a visor of a vehicle for covering portions of a windshield or side windows of the vehicle, the visor being movable between a stowed position and a use position, the visor being further adapted to pivot from a position in which it partially covers a portion of the windshield of the vehicle to a position in which it partially covers a portion of the side window of the vehicle, said visor extender comprising:

a housing having opposite outer surfaces and a passageway defined therein, the housing further having first and second generally rectangular walls, the first wall being attached on three sides thereof to the second wall and open on one side theeof to define a mouth;

a shield movable within the passageway from a retracted position in which the shield is generally disposed within said housing to a position in which the shield extends laterally from the housing through the mouth, said shield being dimensioned such that it is of slightly lesser cross-sectional area than the cross-sectional area of the passageway;

means for attaching the housing to the visor, said attaching means comprising at least one flexible, non-elastic strap mounted on one of said opposing outer surfaces of the housing, the strap being adapted to be wrapped around the visor to attach the housing thereto such that one of said outer opposing surfaces of the housing is in face-to-face relation to the visor, the shield being capable of extending laterally outwardly from the visor; and means for fastening the strap about the visor such that the housing and the strap encompass the visor, the strap having at least two surfaces, said fastening means comprising a hook and loop fastener including hook material disposed on one surface of the strap generally at a first free end thereof substantially back along the length of the strap from said first free end, and loop material disposed on the other surface of the strap generally at a second free end thereof substantially back along the length of the strap from said second free end, said strap being of a sufficient length so that said hook and loop fastener of said strap overlap when said strap is wrapped around a visor, said attaching and fastening means being adapted for attaching and fastening said visor extender about visors having various widths;

wherein one of said walls has a slot formed therein extending substantially the length of the wall, said shield comprising a moving member extending from the shield in registry with the slot such that the moving member extends through the slot for moving the shield between its retracted and extended positions, said moving member being located on the right-hand end of the shield when the shield is in its retracted position, and upon moving the shield to the left to its extended position, said moving member being generally adjacent the mouth of the housing thereby providing substantially full extension of the shield relative to the housing.

3. A visor extender for use in association with a visor of a vehicle for covering portions of a windshield or side windows of the vehicle, the visor being movable between a stowed position and a use position, the visor being further adapted to pivot from a position in which it partially covers a portion of the windshield of the vehicle to a position in which it partially covers a portion of the side widow of the vehicle, said visor extender comprising:

a housing having opposite outer surfaces and a passageway defined therein;

a shield movable within the passageway from a retracted position in which the shield is generally disposed within said housing to a position in which the shield extends laterally from the housing, said shield being dimensioned such that it is of slightly lesser cross-sectional area than the cross-sectional area of the passageway;

means for attaching the housing to the visor, said attaching means comprising at least one flexible, non-elastic strap mounted on one of said opposing outer surfaces of the housing, the strap being adapted to be wrapped around the visor to attach the housing thereto such that one of said outer opposing surfaces of the housing is in face-to-face relation to the visor, the shield being capable of extending laterally outwardly from the visor;

means for fastening the strap about the visor such that the housing and the strap encompass the visor, the strap having at leas tow surfaces, said fastening means comprising a hook and loop fastener including hook material disposed on one surface of the strap generally at a first free end thereof substantially back along the length of the strap from said first free end, and loop material disposed on the other surface of the strap generally at a second free end thereof substantially back along the length of the strap from said second free end, said strap being of a sufficient length so that said hook and loop fastener of said strap overlap when said strap is wrapped around a visor, said attaching and fastening means being adapted for attaching and fastening said visor extender about visors having various widths; and an elastic strap attached to one of said outer surfaces of said housing, the strap being adapted for retaining and receiving articles placed between the strap and the housing.

4. A visor extender for use in association with a visor of a vehicle for covering portions of a windshield or side windows of the vehicle, the visor being movable between a stowed position and a use position, the visor being further adapted to pivot from a position in which it partially covers a portion of the windshield of the vehicle to a position in which it partially covers a portion of the side window of the vehicle, said visor extender comprising:

a housing having opposite outer surfaces and a passageway defined therein;

a shield movable within the passageway from a retracted position in which the shield is generally disposed within said housing to a position in which the shield extends laterally from the housing, said shield being dimensioned such that it is of slightly lesser cross-sectional area than the cross-sectional are of the passageway;

means for attaching the housing to the visor, said attaching means comprising at least one flexible, non-elastic strap mounted on one of said opposing outer surfaces of the housing, the strap being adapted to be wrapped around the visor to attach the housing thereto such that one of said outer opposing surfaces of the housing is in face-to-face relation to the visor, the shield being capable of extending laterally outwardly from the visor;

means for fastening the strap about the visor such that the housing and the strap encompass the visor, the strap being generally centrally mounted along the length of the strap on the housing such that the strap extends transversely of the housing, and wherein said fastening means comprises a buckle attached to an end of one portion of the strap, said buckle being adapted to receive the other portion of the strap for fastening the strap to the visor, said portions of the strap being of sufficient lengths for attaching and fastening said visor extender about visors having various widths; and an elastic strap attached to one of said outer surfaces of said housing, the strap being adapted for retaining and receiving articles placed between the strap and the housing.

* * * * *